United States Patent Office 3,101,975
Patented Aug. 27, 1963

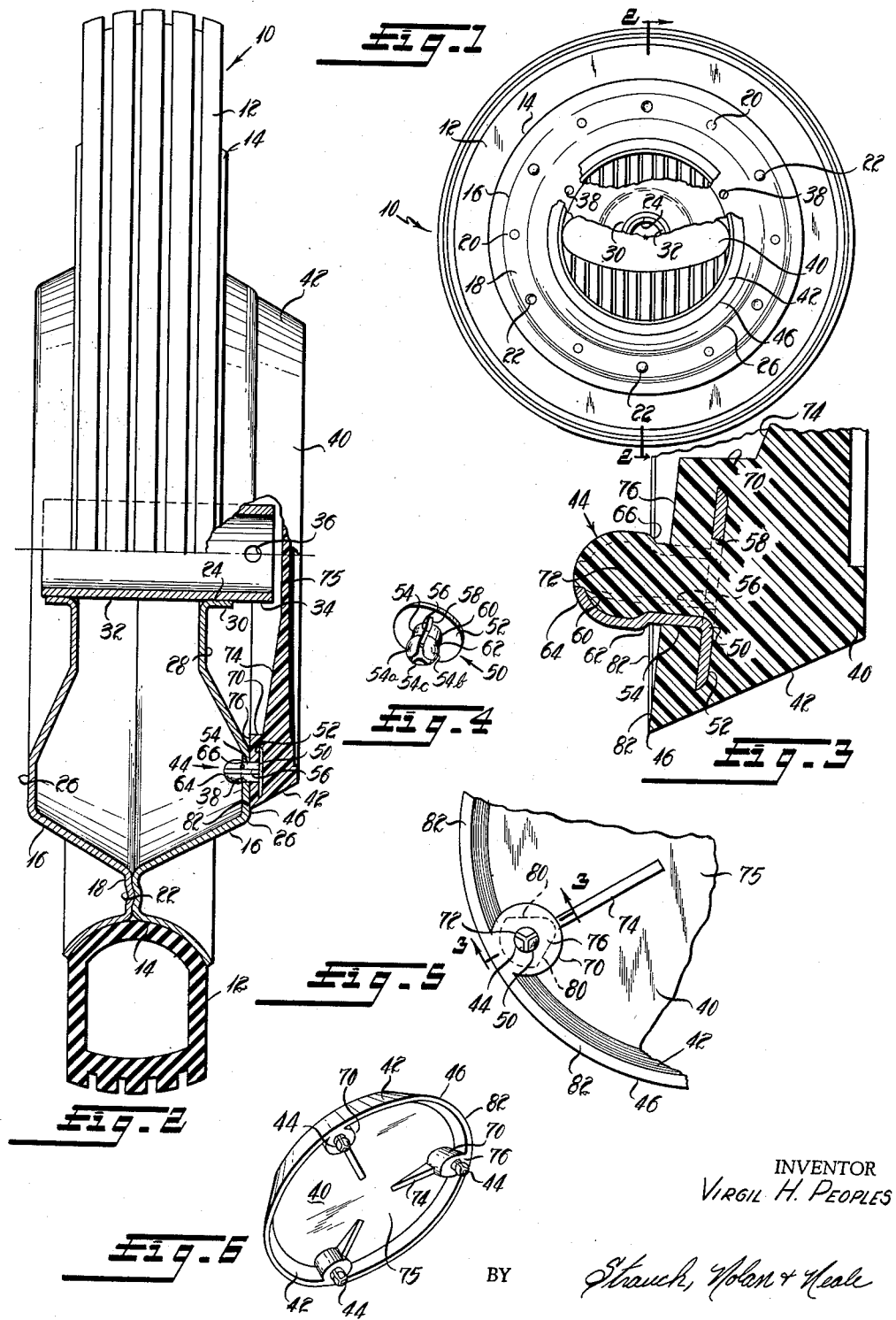

3,101,975
WHEEL AND HUB CAP
Virgil H. Peoples, Marysville, Ohio, assignor to The O. M. Scott & Sons Company, Marysville, Ohio, a corporation of Ohio
Filed Mar. 30, 1959, Ser. No. 802,948
8 Claims. (Cl. 301—37)

This invention relates to an improved wheel and hub cap combination and more particularly to the novel plastic hub cap and cooperative, composite fastener structure which can be easily and readily removably secured to associated side structure of a wheel member.

This invention provides an economical wheel and hub cap combination of particular advantage for use on lawn spreaders which normally consist of a hopper supported by two wheels and an axle passing through the bottom of the hopper and is an improvement over the invention disclosed and claimed in Alan D. Ellies copending application Serial No. 615,277, filed October 11, 1956, now United States Patent No. 2,973,226.

With such a wheel installation, a portion of the wheel journal sleeve or the end of the axle shaft normally projects past the side plane of the wheel. Excepting for the disclosure of the aforenoted copending application, previously used wheeled hopper devices often had right and left wheels and a small metallic hub cap was fastened over the wheel journal or axle projections. These metal caps were provided with conventional securing clips or lugs which keyed in matched holes in wheel structure, or were bent over a portion of the wheel, or were fastened to the axle by cotter pins. The securing clips or lugs of metal caps, after several removals, often broke or lost their resilient ability to flex. Furthermore, the high unit cost of larger metal hub caps, which usually require special securing clips, would not be feasible in lawn spreaders where total production cost is an important factor in mass market appeal.

In the present invention a wheel is provided with two discs, identical in structural details, fastened together and having a journal sleeve projected through their centers and coaxial with the disc axes. One end of the journal sleeve extends beyond one disc and its other end terminates just slightly beyond the exterior of the other disc. The extended end of the journal sleeve is used to key the wheel to an axle shaft, if desired, or the wheel can be freely journaled on an axle shaft and retained by a washer and a cotter pin. In either instance an annular portion of one of the discs will face outwardly. This portion provides an annular platform with several small apertures or pin retaining holes which cooperate with composite securing pins on a plastic hub cap. The hub caps are formed with sufficient depth to afford space for the extended journal sleeve or for the end of the axle which may project beyond a freely journalled wheel. The hub caps are made of a plastic that will provide a firm shape yet have an inherent resilience, such as nylon or polyethylene or molded rubber and the like, and a plurality of composite fastener pins with metallic gripping ends and cores of non-metallic resilient material constitute a unitary part of the hub cap. In assembly, the fastener pins are pressed into the wheel disc apertures to maintain the hub cap snugly and securely over the wheel hub. The unitary hub cap provides a resilient buffer which, in cooperation with the wheel tire, will prevent any metal portion of the wheel from skinning trees, shrubs and other objects.

It is to be understood that this invention is not restricted to wheels for lawn spreaders but is applicable to other wheeled devices, such as lawn mowers and carts.

Accordingly, a primary object of my invention resides in providing a novel wheel and hub cap combination in which the hub cap can be removably secured to either side of the wheel.

Another object resides in providing a novel unitary hub cap which has composite resilient fastener pins used to removably secure the hub cap to a wheel.

Still another object resides in providing a non-metallic resilient hub cap that includes composite metal and nonmetal pins enabling the hub cap to be readily secured to a wheel and firmly maintained in position by the inherent resilience of the material of the hub cap and pins.

Another object resides in the provision of a combination disc wheel, the wheel disc including an annular side platform with circumferentially spaced apertures and a hub cap of non-metallic resilient material having composite, metal and non-metal, fastener pins circumferentially spaced on its inner side which project into associated apertures on the wheel disc and firmly hold the hub cap with its inside edge against the associated annular side platform of the wheel.

A further object resides in providing a novel unitary hub cap of resilient non-metallic material including pin fasteners projecting from one side of the hub cap, the fasteners being split, tubular, metal, glove type, snap fasteners with a core of non-metallic resilient material. In conjunction with this object still another object resides in providing such a hub cap with the composite fasteners molded into the hub cap so the fastener core is integral with the non-metallic hub cap.

A still further object resides in providing a novel snap fastener having a split tubular metal gripping portion backed up by a central core of resilient non-metallic material.

Still another object resides in providing a novel snap fastener with a split tubular metal shank having one end formed with an external gripping shoulder and the other end with a mounting base, the mounting base being covered by a resilient non-metallic material which extends up into and fills the split shank with a core of the resilient non-metallic material.

Further novel features and objects of this invention will become apparent from the following detailed description and the appended claims taken in conjunction with the accompanying drawings showing a preferred embodiment thereof, in which:

FIGURE 1 is a side elevation of a wheel and hub cap combination embodying this invention, with the hub cap partially broken away;

FIGURE 2 is a front view of the wheel and hub cap partially sectioned essentially on line 2—2 of FIGURE 1;

FIGURE 3 is an enlarged detail cross-section view taken on line 3—3 of FIGURE 5, illustrating a metal snap fastener molded into a boss portion on the inner side of a non-metallic hub cap which is not installed on a wheel;

FIGURE 4 is a perspective view illustrating a prior art metal snap fastener component used as the metal shell of the composite fastener in the hub cap;

FIGURE 5 is a partially broken away plan view looking at the inner side of the hub cap; and FIGURE 6 is a perspective view of the inner side of a hub cap incorporating the composite snap fasteners.

With specific reference now to FIGURES 1 and 2, the drawings illustrate the invention as incorporated in an exemplary double disc wheel with the special hub cap removably secured to the wheel disc. The complete wheel 10 has a hollow annular rubber tire 12 carried in the curved rim 14 formed by the abutted peripheries of two identical wheel discs 16.

Each wheel disc 16 has an annular portion 18 immediately adjacent the rim 14 disposed in a substantially radial plane and the portions 18 of both discs 16 are abutted and fastened together by a plurality of spot welds 20 (FIGURE 1). Each disc 16 has an annular dished shape, intermediate its rim 14 and a central aperture 24, forming an annular side platform 26 between the inner and outer peripheries of the disc projecting beyond the plane of the edge of the rim 14. The disc wall, radially within the side platform 26, is tapered to an inner section 28 terminating in an outwardly disposed annular flange 30 surrounding the disc aperture 24. When two discs 16 are assembled and welded the annular flanges 30 are inset slightly below the planes of the associated annular side platforms 26.

A journal sleeve 32 extends through the aligned apertures 24 of the joined discs 16 and is rigidly secured to flanges 30 as by several spot welds and serves as the wheel hub. One end 34 of sleeve 32 projects beyond the plane of the adjacent side platform 26 a sufficient distance to permit the location of diametral holes 36 in the sleeve end 34 slightly offset beyond the plane of the side platform. This permits the wheel to be easily and conveniently drive connected to an axle shaft (not shown) by a cotter pin (not shown).

In the illustrated embodiment, the sleeve 32 is made of rolled sheet metal and the discs 16 are stamped from sheet metal stock with all details, including the hub cap fastener apertures 38, to be described, being formed in a single stamping operation if so desired. It is contemplated that the wheel discs 16 or a single disc and the journal sleeve 32 can be formed from suitable plastic material and bonded together as an assembled wheel.

The above described wheel disc structure has a journal sleeve 32 of sufficient length to maintain wheel alignment under rugged operating conditions and the disc shape also provides a relatively large diameter hub cap platform 26. Three holes 38 are punched or otherwise formed in the annular platforms 26 at circumferentially equally spaced intervals. Holes 38 are preferably round as in FIGURE 1.

Of particular importance in this invention is the unitary hub cap construction consisting primarily of molded semi-rigid non-metallic material, which is preferably one of the plastics such as polyethylene or nylon, having an inherent resilience. Various details of hub cap or wheel cover 40 are shown in the several figures, and the disclosed embodiment utilizes a shallow dished cap with a frusto-conical rim 42. However, the external design configuration can vary in many ways as will be appreciated. Furthermore, the unitary hub cap can be used on single disc wheels, metal or plastic, or on other wheels that have structure providing an annular side platform such as platform 26.

Three fastener pins 44, which are of composite metal and non-metal construction, form part of hub cap 40, projecting from the cupped side of the cap at circumferentially equally spaced positions, inset a slight distance from the edge 46 of hub cap rim 42. Two such pins 44 will suffice to secure the hub cap 40 on the wheel but at least three are preferred and shown in the drawings.

The metallic shell portion 50 of composite fastener pin 44 is a commercially available fastener unit known to the trade as a glove type snap fastener, one being illustrated in FIGURE 4. Fastener unit 50 is constructed of sheet metal and is shaped to provide a radially disposed annular base end flange 52 for mounting purposes. A hollow protuberance 54 or shank, integral with base flange 52, projects centrally therefrom. The protuberance or shank 54 is longitudinally split into sections 54a, 54b and 54c (FIGURE 4), preferably three, by slits 56 that extend slightly into the base flange as at 58 (FIGURES 3 and 4), permitting each of the sections 54a, b and c to be slightly yieldable radially in the manner of a spring. The end 60 of each shank section 54a, b and c is spoon shaped with a shoulder 62. Shank 54 thus terminates in a slightly expanded, somewhat spherical, knob-like split end 64 which has a discontinuous annular gripping shoulder 66 formed by the shoulder 62 of each section 54a, b and c. The knob-like end 64 constitutes a retaining head.

It is clearly evident that the retaining head knob end 64 can be pressed into an opening, in a supporting structure, smaller than the effective diameter of the knob end 64 and approximately equal to the effective diameter of the portion of shank 54 below the shoulder 66. Insertion into an opening is permitted by resilient inward flexing of the sections 54a, b and c, which after insertion can flex outwardly to place the annular shoulder 66 under the edge of the opening.

In the present invention, metal fastener units 50 are embedded in the non-metallic resilient material of the cap 40 with the knob end 64 and a portion of the shank 54 below the shoulder 66 projecting from the inner side of the cap. Each fastener unit 50 is secured in a cylindrical non-metallic boss 70 which is an integral part of the inner side of the hub cap. Bosses 70 extend from the inside surface of the cap 40 and are adjacent to and merged with the rim 42. Shown in FIGURE 3, boss 70 surrounds the base flange 52 of fastener unit 50 and the resilient material, from which the cap and boss is made, extends through the center of the fastener unit 50 and completely fills the interior of shank 54 out to and including the inside of the knob end 64. The core 72 of resilient material provides a reinforcing resilient filling to the metal fastener unit 50 and, with the fastener unit 50, provides the composite fastener pin 44.

Composite pins 44 can be snapped into the platform holes 38 in a manner similar to insertion of a metal fastener unit by itself, the sections of the knob end 64 flexing radially inward to permit passage and flexing outward again to place the shoulder 66 under the edge of wheel platform holes 38. The primary difference between the composite pin 44 and a metal unit 50 by itself being that excessive flexing of the metal sections 54a, b and c during insertion is prevented by the resilient material of core 72 and thus prolongs the life of the metal unit 50. The resilient core 72 furnishes a backup resilient force tending to maintain the knob head 64 in its normal gripping position.

Since the core material is essentially incompressible the initial insertion will resiliently squeeze a portion of the core in the knob end 64 out of the slits 56 between the shank sections 54a, b and c and, as the pin 44 is forced into its hole 38, some of the squeezed out core material will be sheared off. Upon expanded flexing of the knob end 64 the core flexes back to its original shape excepting for the small sheared off areas adjacent each slit 56.

A radial gusset 74, provided for each of the pins 44, is also an integrally molded part of the cap 40 and extends from an associated boss 70 along the inside of the hub cap face toward the hub cap center. Gussets 74 serve to increase the rigidity of the central cover portion 75, and thus provide a more firm but still resilient hub cap structure opposing deflection of and aiding in maintaining the shape of the central portion 75 of the cap.

Metal fastener unit 50 has a portion of its shank 54 embedded in the associated boss 70 below the flat end 76 of the boss. Thus the resilient non-metallic material surrounds a portion of the fastener unit shank 54 and is integrally joined through the shank slits 56 with the core 72 (see FIGURE 3) and, with the portion of core 72 below the end 76 of boss 70, confines flexing of the shank sections 54a, b and c at their joinder with base flange 52 to a very limited amount thus greatly extending the life of the metal fastener unit 50.

Note, in the disclosed configuration, the boss 70 is sufficiently large in diameter to completely surround the flange periphery with the resilient material. This provides a positive annular joinder between the portions of the boss 70 on both sides of the annular metal unit flange 52, and the aforedescribed integral joinder of the boss material with core material through slits 56 and through the center of the base flange 52 completely locks the metal unit 50 into the non-metallic material of the hub cap 40. If segments of the base flange 52 are removed, as indicated by dotted lines 80 in FIGURE 5, the diameter of the boss 70 could be reduced and the interlock of resilient material would still exist even if the boss 70 did not completely surround the metal unit base flange.

Clearly illustrated in FIGURE 3, the base flange 52 of metal fastener unit 50 is substantially parallel with the end face 76 of boss 70 and thus the shank 54 extends normal to the plane of the boss end face 76. Metal unit 50 is disposed in boss 70 so the annular shoulder 66 formed on shank 54 by the knob end 64 is spaced from the flat end face 76 of boss 70 a distance substantially equal to the thickness of the wheel disc platform 26, or in the case of a platform of varying thickness, equal to the thickness of the platform at the edges of holes 38. With this arrangement, when fastener pins 44 are forced into wheel disc platform holes 38, each knob end 64 will project through its associated hole 38 and can then flex outwardly to place its annular shoulder 66 under the edge of the hole 38 and the end face 76 of the associated boss 70 will snugly abut the surface of platform 26.

The hub cap rim end surface 82, adjoining the hub cap rim edge 46, is preferably bevelled away from the rim edge plane toward the center body portion of the hub cap 40 providing an essentially annular knife edge shape to the rim edge 46, which enables a resilient deflection of rim edge 46, for a purpose to be described, when the hub cap is installed on the wheel. As clearly shown in FIGURE 3, the plane of the flat end face 76 of each fastener boss 70 is also inclined away from the rim plane toward the center of the hub cap, substantially the same amount inclination as, and approximately coextensive with, the inclined rim end surface. Thus when the hub cap 40 is assembled on the wheel with composite pins 44 snapped into the platform holes 38 and the end faces 76 of bosses 70 disposed against the surface of platform 26, the central portion 75 of the hub cap will be slightly deflected out of its normal position as in FIGURE 2. Such hub cap deflection creates a small resilient force in a direction tending to urge the pins 44 out of the holes 28, which action keeps the hub cap firm and snug against the platform.

When the hub cap 40 is being installed it will be positioned with pin ends 64 resting in associated pin holes 28. A sharp blow on the hub cap 44 with the heal of a person's hand will force the pin ends 64 into holes 38. The approximately spherical shape of knob ends 64 acting against the edges of holes 38 will cause the knob end 64 to be squeezed radially inward, enabling the pin ends 64 to pass through their associated holes 38 whereupon the inherent resilience of the composite pins 44 will cause the pins to snap into assembled position which places the shoulders 66 of pin shanks 54 in a retaining position behind the edges of the holes. When the pins 44 are thus forced into holes 38, the edge 46 of hub cap rim 42 is deflected slightly and the center portion 75 of the hub cap deformed as the end faces 76 of bosses 70 are forced against the wheel disc platform 26. This edge and cover deflection creates a biasing force between the major portion of hub cap 40 (in essence fulcrumed about the pheripheral rim edge 46 where it engages the annular platform 26) and pins 44 to maintain the pin shoulders 66 firmly pressed against the inner side of the platform 26 and also maintaining a tight dust and dirt seal between the hub cap edge 46 and the outer side of platform 26. The rim edge 46 contacts the platform radially outward of the outer edges of pin holes 38.

Hub cap 40 can be readily removed by gripping the rim 42 between two of the pins 44 and exerting a pull force outwardly, sufficient to cause the sections of knob ends 64 of pins 44 to flex inwardly, and pull the pins 44 out of the holes 38. For wheeled devices larger than garden mate-rial spreaders, which would have heavier wall construction for the hub caps, an appropriate tool, like a screwdriver, can be inserted under the hub cap rim at a location of a boss 70, and the cap can be readily pried off.

Circular pin holes 38 have been used in the present invention, in which instance the composite pin ends 64 were formed substantially spherical. Of course, the ends of pins 44 and holes 38 could be triangular or some other shape but the spherical shape knob end and circular holes are easier to manufacture.

The foregoing description discloses a new wheel and hub cap combination which embodies economical, rugged construction for both wheel and hub cap. The wheel construction provides a large diameter hub cap platform which together with the retained hub cap provides an attractive highly decorative appearance and enables a large hub cap area to be used with a readily discernible insignia. This invention includes a unitary hub cap, with composite retaining pins, molded into the cap which is primarily made of inexpensive non-metallic material. The hub caps are easily installed and removed, provide an excellent dust seal, and being of a resilient material, such as semi-rigid plastic, constitute an effective buffer when wheels of a device such as a lawn material spreader come in contact with shrubs, trees or other objects.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination: a wheel and hub cap structure wherein, said wheel includes an annular side platform surrounding the wheel hub and having a plurality of circumferentially spaced apertures through the platform; and said hub cap comprises a body made from non-metallic resilient material having a physical characteristic providing the hub cap with a firm shape, said body having a peripheral abutment edge engaging said platform and a plurality of resilient fastening pins with retaining heads extending from said body within the confines of said peripheral abutment edge; said fastening pins being snap fasteners, each of which comprises a hollow metal protuberance terminating at one end in an enlargement constituting said retaining head and providing an external annular gripping shoulder, a base portion integral with said protuberance at its other end and anchored in said non-metallic resilient body, said protuberance being longitudinally split into a plurality of portions from said one end to adjacent the joinder of said protuberance with said base portion, and a center core portion of solid non-metallic resilient material integral with said resilient body and completely filling the interior of said protuberance including said enlargement; said pins being extended through associated ones of said apertures so the retaining heads are disposed behind the platform edges of said apertures and said heads and the inherent resilience in said hub cap resulting from the coaction between said platform and said peripheral abutment edge comprising means providing a snug gripping action between said hub cap and said side platform.

2. A wheel and hub cap structure as defined in claim 1, wherein said base portion is a flange disposed to extend radially outward from said protuberance; non-metallic reinforcing means integral with said hub cap body comprise bosses projecting from the inner side of said hub cap body and molded around both sides of said base portion flange; and said core is integrally joined with said boss.

3. A wheel and hub cap structure as defined in claim 2 wherein said boss completely encompasses said base portion flange and integrally joins with said core on both sides of said base portion flange.

4. A wheel and hub cap structure as defined in claim 2 wherein said bosses have substantially flat end surfaces and are disposed adjacent said peripheral abutment edge; said fastening pins extend from said boss end surfaces substantially normal to said boss end surfaces; and said annular shoulders on said fastening pins are spaced from said boss end surfaces a distance substantially equal to the thickness of said platform at the edges of said apertures.

5. For use as a hub closure, a cap of non-metallic resilient material including an annular rim; at least three snap fasteners of composite construction, each comprising a split tubular shell of resilient metal with a core of non-metallic resilient material, disposed in circumferentially equally spaced relationship on the inner side of said cap radially inward of said rim; a reinforcing means of resilient non-metallic material connecting between each pin fastener, the main body of the cap and a portion of said rim immediately adjacent the pin fastener; the tubular shell of each said composite pin fastener comprising a hollow protuberance terminating at one end in an enlargement to provide an external annular shoulder, a base portion integral with said protuberance at its other end and anchored securely in said reinforcing means; said protuberance being longitudinally split into a plurality of portions from said one end to adjacent the joinder of said protuberance with said base portion; and said reinforcing means is an integral part of said non-metallic resilient material and covers said base portion and provides the center core which fills, and engages the interior surface of said protuberance.

6. A hub closure as defined in claim 5, wherein the surface of said rim is inclined slightly out of the plane of the outer peripheral rim edge toward the inside of said cap; said base portion of said shell includes a flange; and said reinforcing means comprises a non-metallic boss for each said pin which surrounds all portions of said flange to anchor the shell portion of said pin and is integral with the core portion of said pin.

7. A hub closure as defined in claim 6, wherein each said boss is adjacent said rim and has a substantially flat end surface inclined substantially coextensive with said inclined rim surface; said pins project from associated bosses essentially normal to the boss end surface; and the head of said composite pin provides an annular shoulder spaced from said boss end surface.

8. A composite snap fastener comprising: a hollow protuberance terminating at one end in an enlargement head to provide an external annular retaining shoulder; a base mounting portion integral with said protuberance at its other end; said protuberance being longitudinally split into a plurality of portions from said one end to adjacent the joinder of said protuberance with said base portion; and a unitary resilient non-metallic material covering said base mounting portion and providing a center resilient core filling and engaging all of the interior surface of said protuberance, said unitary non-metallic material extending from said base portion, around and engaging the exterior surface of said protuberance, to a position between said base portion and said annular shoulder.

References Cited in the file of this patent

UNITED STATES PATENTS

| | | |
|---|---|---|
| 1,481,484 | Rieske | Jan. 22, 1924 |
| 1,870,061 | Mitchell | Aug. 2, 1932 |
| 2,271,495 | Hall | Jan. 27, 1942 |
| 2,360,647 | Churchill | Oct. 17, 1944 |
| 2,590,264 | Meyers et al. | Mar. 25, 1952 |
| 2,663,751 | Bashara | Dec. 22, 1953 |
| 2,813,712 | Stanis | Nov. 19, 1957 |
| 2,884,160 | Abplanalp | Apr. 28, 1959 |
| 2,895,199 | Jones | July 21, 1959 |
| 2,973,226 | Ellies | Feb. 28, 1961 |

FOREIGN PATENTS

| | | |
|---|---|---|
| 456,866 | Great Britain | Nov. 17, 1936 |
| 811,431 | Germany | Sept. 8, 1952 |
| 1,128,655 | France | Aug. 27, 1956 |
| 1,152,904 | France | Sept. 16, 1957 |